(12) United States Patent
Folestad et al.

(10) Patent No.: US 6,490,035 B1
(45) Date of Patent: Dec. 3, 2002

(54) MIXING APPARATUS

(75) Inventors: Staffan Folestad, Västra Frölunda (SE); Mats Johansson, Göteborg (SE)

(73) Assignee: AstraZeneca AB, Sodertalje (SE)

( * ) Notice: Subject to any disclaimer, the term of this patent is extended or adjusted under 35 U.S.C. 154(b) by 0 days.

(21) Appl. No.: 09/380,938

(22) PCT Filed: Jul. 29, 1999

(86) PCT No.: PCT/SE99/01325

§ 371 (c)(1),
(2), (4) Date: Sep. 9, 1999

(87) PCT Pub. No.: WO00/07705

PCT Pub. Date: Feb. 17, 2000

(30) Foreign Application Priority Data

Aug. 7, 1998 (SE) ................................................ 9802690

(51) Int. Cl.[7] ........................... B01F 3/00; G01N 21/25; G01N 21/21
(52) U.S. Cl. ........................ 356/319; 356/301; 356/367
(58) Field of Search ................................. 356/319, 325, 356/323, 301, 402, 425, 367

(56) References Cited

U.S. PATENT DOCUMENTS

| 4,154,537 | A | * | 5/1979 | Kress ........................... 134/34 |
| 5,859,708 | A | * | 1/1999 | Feldman ...................... 356/425 |
| 6,052,195 | A | * | 4/2000 | Mestha et al. .............. 356/425 |
| 6,075,608 | A | * | 6/2000 | Feldman et al. ............ 356/425 |

FOREIGN PATENT DOCUMENTS

| EP | 0631810 | 1/1995 |
| SU | 1402856 | 8/1997 |

* cited by examiner

Primary Examiner—F. L. Evans
(74) Attorney, Agent, or Firm—White & Case LLP

(57) ABSTRACT

A mixing apparatus for and a method of supplying a mixture having a required homogeneity, the mixing apparatus comprising: a mixing device (1; 101) for mixing a plurality of materials, the mixing device (1; 101) including a mixing vessel (7; 107) and having at least one inlet port (8, 9; 108, 109, 110) and an outlet port (11; 111); a supply line (19; 119) connected to the outlet port (11; 111) of the mixing device (1; 101); and at least one measuring device (23, 25, 27; 123, 125, 127) for measuring on-line at at least one point in the supply line (19; 119) the composition of the mixed material passing in use through the supply line (19; 119).

46 Claims, 8 Drawing Sheets

MIXING APPARATUS

The present invention relates to an apparatus for and a method of mixing a plurality of materials, specifically powders, to supply a mixture having a required homogeneity.

The present invention provides a mixing apparatus for supplying a mixture having a required homogeneity, comprising: a mixing device for mixing a plurality of materials, the mixing device including a mixing vessel and having at least one inlet port and an outlet port; a supply line connected to the outlet port of the mixing device; and at least one measuring device for measuring on-line at at least one point in the supply line the composition of the mixed material passing in use through the supply line.

Preferably, the at least one measuring device is configured to measure on-line the composition of the mixed material passing in use through the supply line at a plurality of points in the supply line.

In a preferred embodiment the mixing apparatus comprises a plurality of measuring devices for measuring on-line at a plurality of points in the supply line the composition of the mixed material passing in use through the supply line.

Preferably, one measurement point is at the inlet end of the supply line.

Preferably, one measurement point is at the outlet end of the supply line.

In a particularly preferred embodiment one measurement point is at the inlet end of the supply line and another measurement point is at the outlet end of the supply line.

Preferably, the mixing apparatus further comprises at least one flow diversion mechanism for selectively diverting from at least one point in the supply line mixed material passing in use through the supply line which is measured as not having the required homogeneity. More preferably, the at least one diversion point is downstream of the upstreammost measurement point.

In a preferred embodiment the mixing apparatus comprises a plurality of flow diversion mechanisms for selectively diverting from one or more of a plurality of points in the supply line mixed material passing in use through the supply line which is measured as not having the required homogeneity.

Preferably, each diversion point is downstream of a respective measurement point.

In a particularly preferred embodiment each flow diversion mechanism comprises a valve disposed in the supply line, the valve having an inlet port and a first outlet port connected in the supply line and a second outlet port through which mixed material measured as not having the required homogeneity is in use diverted.

Preferably, the mixing apparatus further comprises a transfer line into which mixed material measured as not having the required homogeneity is in use diverted.

More preferably, at least a section of the transfer line is configured such that the mixed material diverted thereinto can flow by gravitational flow therethrough.

Preferably, the second outlet port of each valve is connected to the transfer line.

Preferably, the mixing apparatus further comprises a flow control mechanism for causing the mixed material to flow through the supply line.

In one embodiment the flow control mechanism is a feed mechanism for feeding the mixed material through the supply line.

In another embodiment the supply line is configured such that the mixed material can flow by gravitational flow therethrough and the flow control mechanism is a valve for selectively permitting the mixed material to flow through the supply line.

Preferably, the supply line is substantially vertically directed.

Preferably, the mixing apparatus further comprises a plurality of supply vessels for containing separately the materials to be mixed in the mixing vessel of the mixing device and a further supply vessel for containing a mixture of the materials to mixed, the supply vessels being connected to the at least one inlet port of the mixing device by respective feed lines which each include a flow control mechanism operable to meter per unit time to the mixing device amounts of the respective materials to be mixed and the mixture of the materials to be mixed.

More preferably, the mixing apparatus further comprises a further measuring device in the feed line connected to the further supply vessel for measuring the composition of the mixed material passing in use through the feed line connected to the further supply vessel.

Preferably, at least one of the at least one measuring device is a spectroscopic measuring device.

More preferably, the spectroscopic measuring device is one of a reflectance, transflectance or transmission device.

In one preferred embodiment the spectroscopic measuring device is an infra-red spectrophotometer.

In another preferred embodiment the spectroscopic measuring device is a near infra-red spectrophotometer.

In yet another preferred embodiment the spectroscopic measuring device is an x-ray spectrophotometer.

In still another preferred embodiment the spectroscopic measuring device is a visible light spectrophotometer.

In a further preferred embodiment the spectroscopic measuring device is a raman spectrophotometer.

In a yet further preferred embodiment the spectroscopic measuring device is a microwave spectrophotometer.

In a still further preferred embodiment the spectroscopic measuring device is a nuclear magnetic resonance spectrophotometer.

Preferably, at least one of the at least one measuring device is a polarimeter.

Preferably, the mixing vessel of the mixing device is a non-rotating vessel.

In one embodiment the mixing device is a continuous mixer.

In an alternative embodiment the mixing device is a batch mixer.

The present invention also provides a method of supplying a mixture having a required homogeneity, comprising the steps of: introducing a plurality of materials to be mixed into a mixing vessel of a mixing device; mixing the plurality of materials in the mixing vessel; supplying mixed material from an outlet port of the mixing device through a supply line; and measuring on-line at at least one point in the supply line the composition of the mixed material passing through the supply line.

In a preferred embodiment the method comprises the step of measuring on-line at a plurality of points in the supply line the composition of the mixed material passing through the supply line.

Preferably, one measurement point is at the inlet end of the supply line.

Preferably, one measurement point is at the outlet end of the supply line.

In a particularly preferred embodiment one measurement point is at the inlet end of the supply line and another measurement point is at the outlet end of the supply line.

Preferably, the method further comprises the step of diverting from at least one point in the supply line the mixed material passing through the supply line which is measured as not having the required homogeneity.

More preferably, the at least one diversion point is downstream of the upstreammost measurement point.

In a preferred embodiment the method comprises the step of selectively diverting from one or more of a plurality of points in the supply line the mixed material passing through the supply line which is measured as not having the required homogeneity.

Preferably, each diversion point is downstream of a respective measurement point.

In one embodiment the materials to be mixed are introduced continuously into the mixing vessel.

Preferably, the method further comprises the step of transferring the mixed material diverted from the supply line to a further vessel.

More preferably, the step of introducing the materials to be mixed into the mixing vessel of the mixing device comprises the step of selectively metering per unit time to the mixing device amounts of the mixed material from the further vessel and the respective materials to be mixed and further comprising the step of measuring on-line the composition of the mixed material metered from the further vessel such that amounts of the respective materials to be mixed can be separately selectively metered to the mixing device in addition to mixed material metered from the further vessel so as to achieve the required composition.

In an alternative embodiment the materials to be mixed are introduced as a batch into the mixing vessel of the mixing device.

Preferably, the mixing vessel of the mixing device is a non-rotating vessel.

Preferred embodiments of the present invention will now be described hereinbelow by way of example only with reference to the accompanying drawings, in which:

FIGS. 1 and 2 illustrate a mixing apparatus or a component thereof in accordance with a first embodiment of the present invention.

Figure 1:
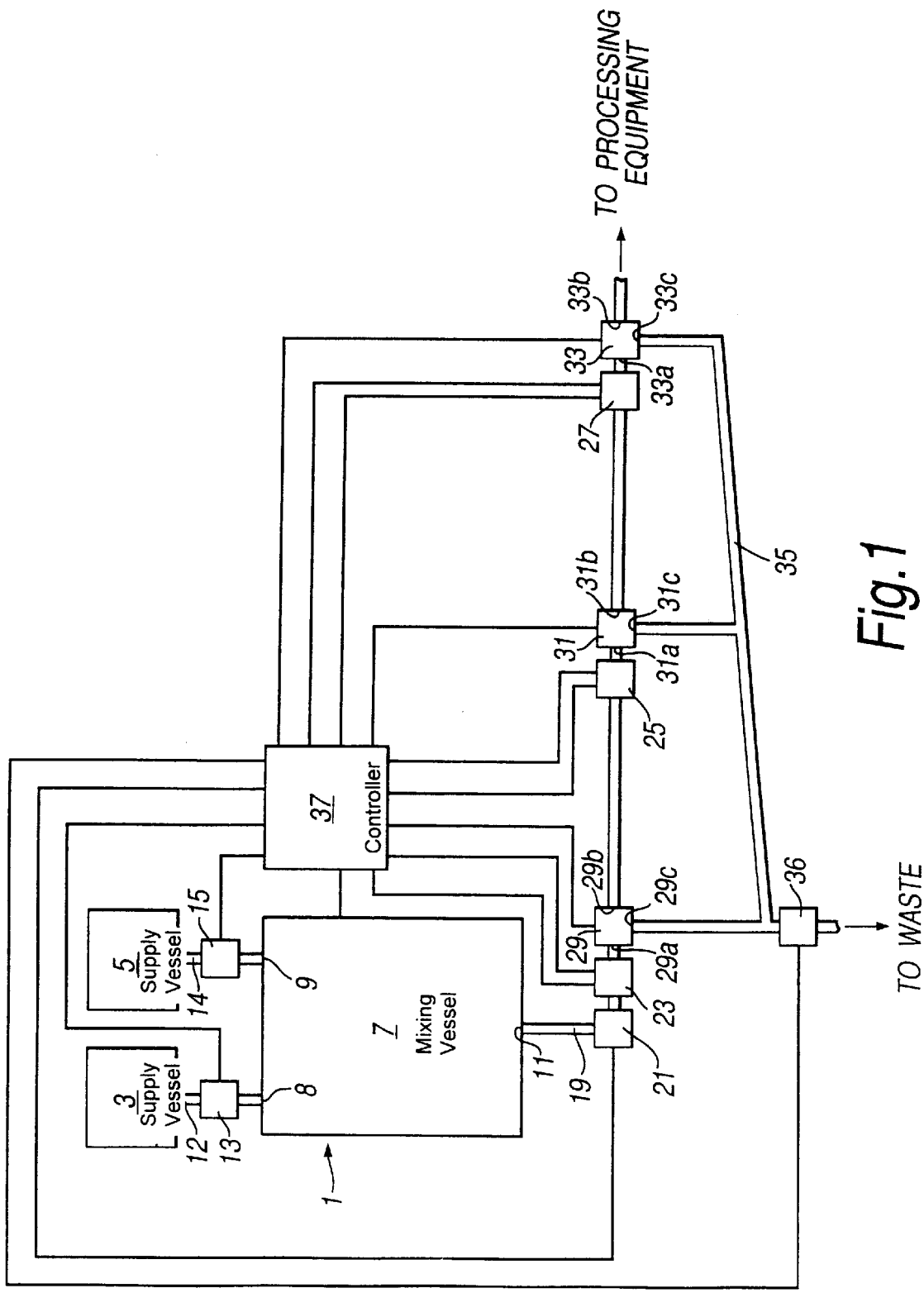
FIG. 1 illustrates schematically a mixing apparatus in accordance with a first embodiment of the present invention.

The mixing apparatus comprises a mixing device 1 for mixing materials, in this embodiment a batch mixer having a non-rotating mixing vessel, in particular a convective mixer such as an orbiting screw mixer, a first supply vessel 3 for containing a first material to be mixed by the mixing device 1 and a second supply vessel 5 for containing a second material to be mixed by the mixing device 1. The mixing device 1 includes a mixing vessel 7 and has first and second inlet ports 8, 9 and an outlet port 11. The first inlet port 8 of the mixing device 1 is connected to the first supply vessel 3 by a first feed line 12 which includes a first feed mechanism 13, typically a pneumatic or mechanical device, for metering a predeterminable amount of the first material to the mixing device 1. The second inlet port 9 of the mixing device 1 is connected to the second supply vessel 5 by a second feed line 14 which includes a second feed mechanism 15, typically a pneumatic or mechanical device, for feeding a predeterminable amount of the second material to the mixing device 1.

The mixing apparatus further comprises a supply line 19 connected to the outlet port 11 of the mixing device 1 for supplying mixed material to processing equipment, such as a tabletting machine. In this embodiment sections of the supply line 19 are horizontally directed and mixed material exiting the outlet port 11 of the mixing device 1 cannot pass through the supply line 19 by gravitational flow. The supply line 19 includes a feed mechanism 21, typically a pneumatic or mechanical device, for feeding material therethrough. The supply line 19 further includes along the length thereof a plurality of measuring devices, in this embodiment first, second and third measuring devices 23, 25, 27, for measuring the composition of the mixed material at a plurality of points in the supply line 19 as the mixed material passes therethrough. In this embodiment the first measuring device 23 is located at the inlet end of the supply line 19 and the third measuring device 27 is located at the outlet end of the supply line 19, thereby ensuring that the mixed material is measured immediately on passing into the supply line 19 and immediately prior to being fed to processing equipment. The supply line 19 further includes a plurality of three-way valves, in this embodiment first, second and third valves 29, 31, 33, each disposed immediately downstream of a respective one of the first, second and third measuring devices 23, 25, 27. The first, second and third valves 29, 31, 33 each include an inlet port 29a, 31a, 33a, a first outlet port 29b, 31b, 33b and a second outlet port 29c, 31c, 33c, with the inlet ports 29a, 31a, 33a and the first outlet ports 29b, 31b, 33b being in the supply line 19 and the second outlet ports 29c, 31c, 33c being connected to a waste line 35 for transferring mixed material not having the required homogeneity to a waste vessel. The waste line 35 includes a feed mechanism 36 for feeding the non-homogenous mixed material to the waste vessel. In this embodiment the sections of the waste line 35 upstream of the feed mechanism 36 have a downwardly-directed component such that the non-homogeneous mixed material flows by gravitational flow to the feed mechanism 36.

The mixing apparatus further comprises a controller 37, typically a computer or a programmable logic controller (PLC), for controlling the operation of each of the mixing device 1, the first feed mechanism 13 connected to the first supply vessel 3, the second feed mechanism 15 connected to the second supply vessel 5, the feed mechanism 21 in the supply line 19, the first, second and third measuring devices 23, 25, 27 in the supply line 19, the first, second and third valves 29, 31, 33 in the supply line 19 and the feed mechanism 36 in the waste line 35.

Figure 2:
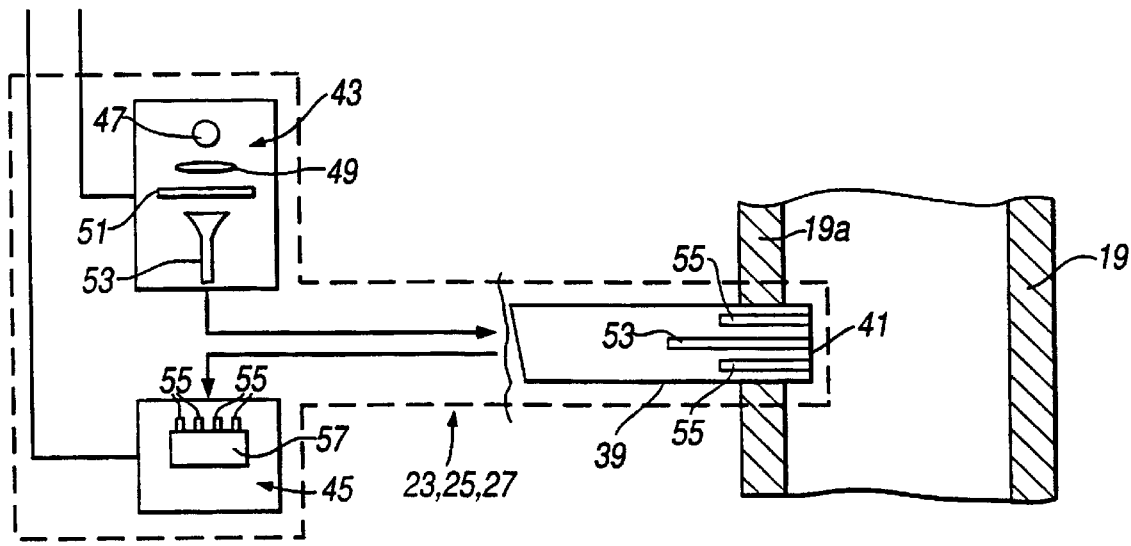
FIG. 2 illustrates a measuring device of the mixing apparatus of FIG. 1.

As illustrated in FIG. 2, each of the first, second and third measuring devices 23, 25, 27 is a reflectance measuring device of the same construction and comprises a measurement probe 39, in this embodiment a reflectance probe, which extends through the peripheral is wall 19a of the supply line 19 such that the distal end 41 of the measurement probe 39, through which radiation is emitted and received, is directed into the supply line 19. In this way, reflectance measurements can be taken from the mixed material passing through the supply line 19. Each of the measuring devices 23, 25, 27 further comprises a radiation generating unit 43 for generating electromagnetic radiation and a detector unit 45 for detecting the radiation diffusely reflected by the mixed material in the supply line 19. In this embodiment the radiation generating unit 43 comprises in the following order a radiation source 47, a focusing lens 49, a filter arrangement 51 and at least one fibre cable 53 for leading the focused and filtered radiation to the distal end 41 of the measurement probe 39. In this embodiment the radiation source 47 is a broad spectrum visible to infra-red source, such as a tungsten-halogen lamp, which emits radiation in the near infra-red interval of from 400 to 2500 nm and the filter arrangement 51 comprises a plurality of filters each allowing the passage of radiation of a respective single frequency or frequency band. In other embodiments the radiation source 47 could be any of a source of visible light, such as an arc lamp, a source of x-rays, a laser, such as a diode laser, or a light-emitting diode (LED) and the filter arrangement 51 could be replaced by a monochromator or a spectrometer of Fourier transform kind. In this embodiment the detector unit 45 comprises in the following order an array of fibre cables 55, whose distal ends are arranged around the distal end of the at least one fibre cable 53 through which radiation is emitted, and a detector 57 connected to the fibre cables 55. The detector 57 is preferably one of an integrating detector, such as an Si, PbS or In-Ga-As integrating detector, a diode array detector, such as an Si or In-Ga-As diode array detector, or a one or two-dimensional array detector, such as a CMOS chip, a CCD chip or a focal plane array. The distal ends of the fibre cables 55 are preferably spaced from the distal end of the at least one fibre cable 53 in order to minimise the effect of specular reflection or stray energy reaching the fibre cables 55. In use, the detector 57 will produce signals depending upon the composition of the mixed material and the frequency of the provided radiation. These signals are amplified, filtered and digitised and passed to the controller 37.

Figure 3:
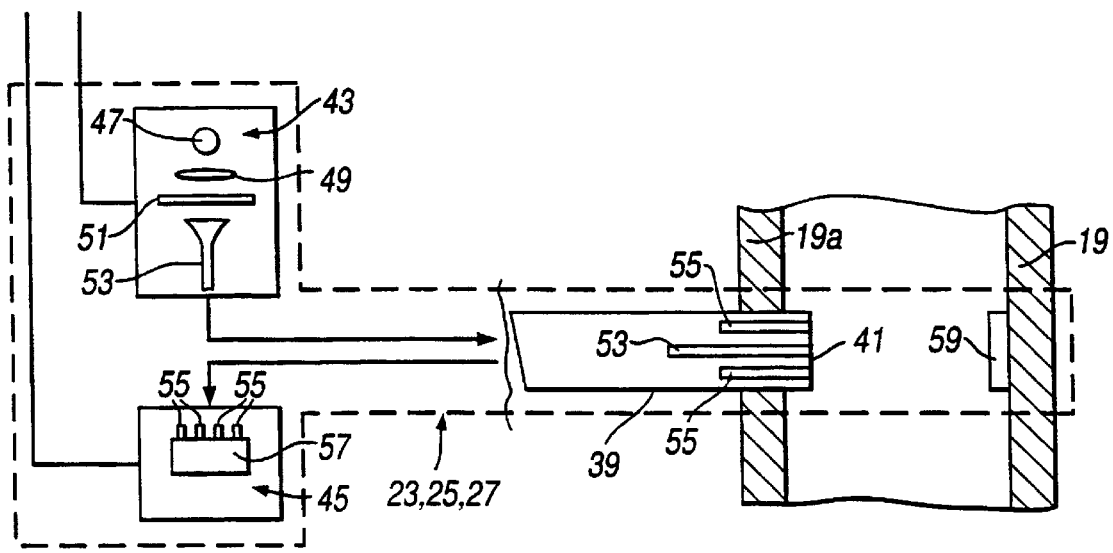
FIG. 3 illustrates a first modified measuring device for the mixing apparatus of FIG. 1.
Figure 4:
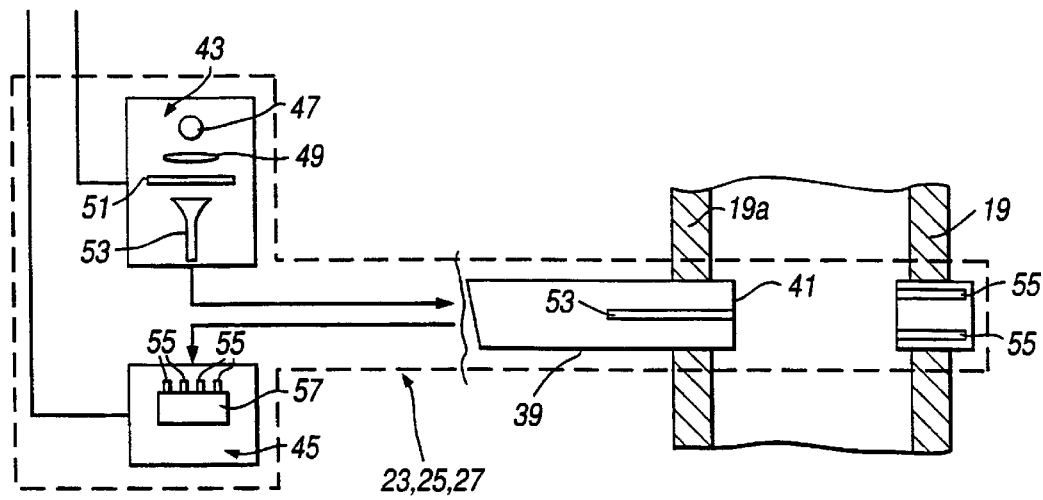
FIG. 4 illustrates a second modified measuring device for the mixing apparatus of FIG. 1.
Figure 5:
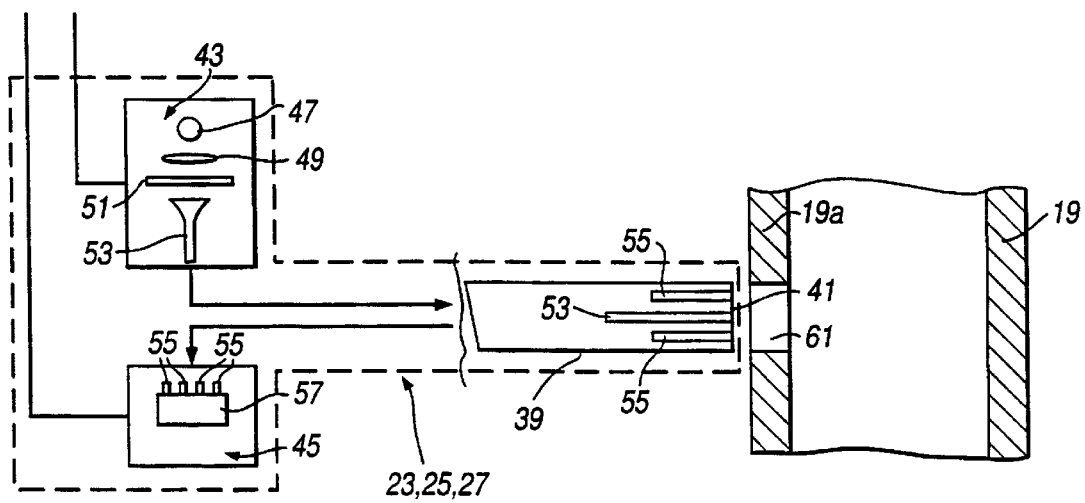
FIG. 5 illustrates a third modified measuring device for the mixing apparatus of FIG. 1.

FIGS. 3 to 5 illustrate modified measuring devices 23, 25, 27 for the above-described mixing apparatus. These modified measuring devices 23, 25, 27 are quite similar structurally and operate in the same manner as the measuring device 23, 25, 27 in the above-described mixing apparatus. Hence, in order not to duplicate description unnecessarily, only the structural differences of these modified measuring devices 23, 25, 27 will be described.

FIG. 3 illustrates a first modified measuring device 23, 25, 27 which operates as a transflective measuring device. This measuring device 23, 25, 27 differs from the first-described measuring device 23, 25, 27 in that a reflective surface 59, typically a mirrored surface, is disposed in the supply line 19, in this embodiment on the inner side of the supply line 19, opposite the path of the radiation provided by the at least one fibre cable 53. In use, radiation provided by the at least one fibre cable 53 passes through the material in the supply line 19 and is reflected back to the fibre cables 55 by the reflective surface 59.

FIG. 4 illustrates a second modified measuring device 23, 25, 27 which operates as a transmissive measuring device. This measuring device 23, 25, 27 differs from the first-described measuring device 23, 25, 27 in that the distal ends of the fibre cables 55 are disposed at the side of the supply line 19, in this embodiment on the inner side of the supply line 19, opposite the path of the radiation provided by the at least one fibre cable 53. In use, radiation provided by the at least one fibre cable 53 passes through the material in the supply line 19 and is received by the opposing fibre cables 55.

FIG. 5 illustrates a third modified measuring device 23, 25, 27 which operates as a reflective measuring device. This measuring device 23, 25, 27 differs from the first-described measuring device 23, 25, 27 only in that the measurement probe 39 does not extend into the supply line 19. Instead, the peripheral wall 19a of the supply line 19 includes a window 61 which is transparent or at least translucent to the radiation employed by the measuring device 23, 25, 27. It will, of course, be appreciated that the measuring devices 23, 25, 27 described in relation to FIGS. 3 and 4 could also be so modified.

In use, the first and second feed mechanisms 13, 15 connected respectively to the first and second supply vessels 3, 5 are controlled by the controller 37 to meter in the required proportions amounts of the first and second materials to the mixing vessel 7 of the mixing device 1. Under the control of the controller 37 the mixing device 1 is then operated for a predetermined period of time, this period of time depending upon the materials being mixed. After such mixing, a mixture of the first and second materials having a required homogeneity should have been achieved. However, this may not necessarily be the case as insufficient time may have been allowed for mixing or in some circumstances, whilst the bulk of the mixed material may have the required homogeneity, pockets may exist in the mixed material which do not have the required homogeneity. Under the control of the controller 37, with the first, second and third valves 29, 31, 33 in the supply line 19 set to provide communication between the respective inlet ports 29a, 31a, 33a and first outlet ports 29b, 31b, 33b thereof, the feed mechanism 21 in the supply line 19 is actuated to feed mixed material from the mixing vessel 7 of the mixing device 1 through the supply line 19. As the mixed material passes through the supply line 19 the mixed material is first measured by the first measuring device 23. If the mixed material passing the first measuring device 23 is measured as having the required homogeneity, then the mixed material is fed further through the supply line 19 by the feed mechanism 21 therein. If, however, the mixed material passing the first measuring device 23 is measured as not having the required homogeneity, then, under the control of the controller 37, the first valve 29 in the supply line 19 is set to provide communication between the inlet port 29a and the second outlet port 29c thereof so as to divert the mixed material not having the required homogeneity into the waste line 35 and the feed mechanism 36 in the waste line 35 is actuated for a predetermined period of time, with the mixed material being continuously measured by the first measuring device 23. If, during this period of time, the mixed material passing the first measuring device 23 is measured as having the required homogeneity, then, under the control of the controller 37, the feed mechanism 36 in the waste line 35 is stopped and the first valve 29 in the supply line 19 is set to provide communication between the inlet port 29a and the first outlet port 29b thereof so as to restore the flow path through the supply line 19. If, however, after this period of time, the mixed material passing the first measuring device 23 is still measured as not having the required homogeneity, then, under the control of the controller 37, the feed mechanism 21 in the supply line 19 is stopped, the feed mechanism 36 in the waste line 35 is stopped, the first valve 29 in the supply line 19 is set to provide communication between the inlet port 29a and the first outlet port 29b thereof and the mixing device 1 is operated for a further predetermined period of time. After such further mixing, the above-described steps are repeated. When the mixed material passing the first measuring device 23 is measured as having the required homogeneity, then the mixed material is fed further through the supply line 19 by the feed mechanism 21 therein. As the mixed material is fed further through the supply line 19 the mixed material is measured by the second measuring device 25 downstream of the first measuring device 23. If the mixed material passing the first and second measuring devices 23, 25 is measured as having the required homogeneity, then the mixed material is fed further through the supply line 19 by the feed mechanism 21 therein. If, however the mixed material passing the second measuring device 25 is measured as no longer having the required homogeneity, as may occasionally happen because, for example, of segregation during flow, then, under the control of the controller 37, the second valve 31 in the supply line 19 is set to provide communication between the inlet port 31a and the second outlet port 31c thereof so as to divert the mixed material not having the required homogeneity into the waste line 35 and the feed mechanism 36 in the waste line 35 is actuated, with the mixed material being continuously measured by the second measuring device 25. When the mixed material passing the second measuring device 25 is measured again as having the required homogeneity, then, under the control of the controller 37, the feed mechanism 36 in the waste line 35 is stopped and the second valve 31 in the supply line 19 is set to provide communication between the inlet port 31a and the first outlet port 31b thereof so as to restore the flow path through the supply line 19. When the mixed material passing the first and second measuring devices 23, 25 is measured as having the required homogeneity, then the mixed material is fed further through the supply line 19 by the feed mechanism 21 therein. As the mixed material is fed further through the supply line 19 the mixed material is measured by the third measuring device 27 downstream of the second measuring device 25. If the mixed material passing the first, second and third measuring devices 23, 25, 27 is measured as having the required homogeneity, then the mixed material is fed further through the supply line 19 by the feed mechanism 21 therein to processing equipment. If, however, the mixed material passing the third measuring device 27 is measured as no longer having the required homogeneity, then, under the control of the controller 37, the third valve 33 in the supply line 19 is set to provide communication between the inlet port 33a and the second outlet port 33c thereof so as to divert the mixed material not having the required homogeneity into the waste line 35 and the feed mechanism 36 in the waste line 35 is actuated, with the mixed material being continuously measured by the third measuring device 27. When the mixed material passing the third measuring device 27 is measured again as having the required homogeneity, then, under the control of the controller 37, the feed mechanism 36 in the waste line 35 is stopped and the third valve 33 in the supply line 19 is set to provide communication between the inlet port 33a and the first outlet port 33b thereof so as to restore the flow path through the supply line 19. When the mixed material passing the first, second and third measuring devices 23, 25, 27 is measured as having the required homogeneity, then the mixed material is fed further through the supply line 19 by the feed mechanism 21 therein to processing equipment.

Figure 6:
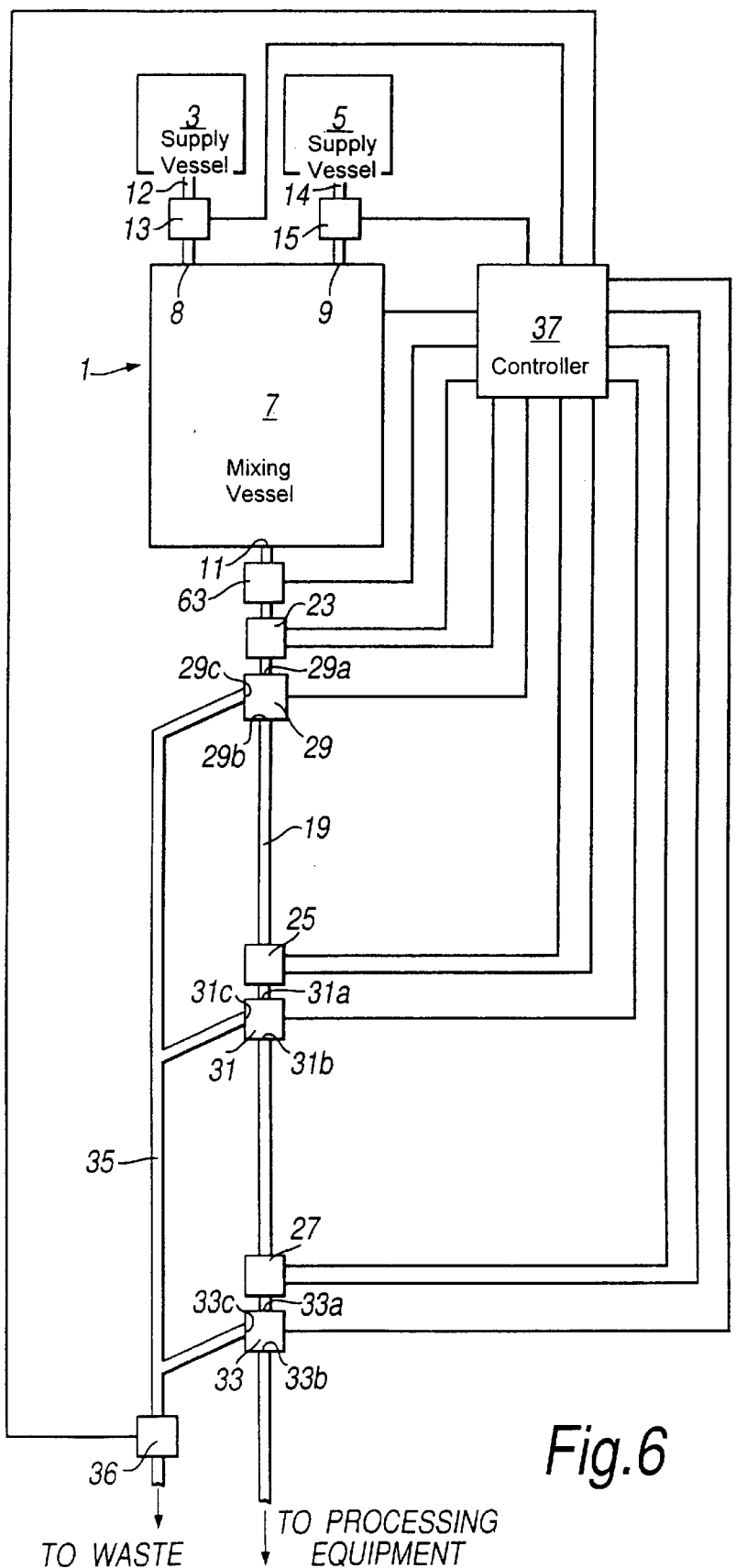
FIG. 6 illustrates schematically a mixing apparatus in accordance with a second embodiment of the present invention.

FIG. 6 illustrates a mixing apparatus in accordance with a second embodiment of the present invention.

The mixing apparatus in accordance with this embodiment is almost structurally identical to the mixing apparatus in accordance with the first embodiment of the present invention. Hence, in order not to duplicate description unnecessarily, only the structural differences of this modified mixing apparatus will be described; like reference signs designating like parts.

The mixing apparatus in accordance with this embodiment differs from the mixing apparatus in accordance with the first embodiment of the present invention only in that the supply line 19 is configured such that material passes therethrough by gravitational flow and in that a two-port feed valve 63 replaces the feed mechanism 21 in the supply line 19. In this embodiment the supply line 19 is vertically directed, but it will, of course, be appreciated that other configurations are possible. Indeed, any configuration could be employed where the supply line 19 has a downwardly-directed component sufficient to provide gravitational flow therethrough.

In use, the mixing apparatus in accordance with this embodiment operates in the same manner as the mixing apparatus in accordance with the first embodiment of the present invention, but with the feed valve 63 being selectively opened and closed to allow mixed material to flow through the supply line 19.

Figure 7:
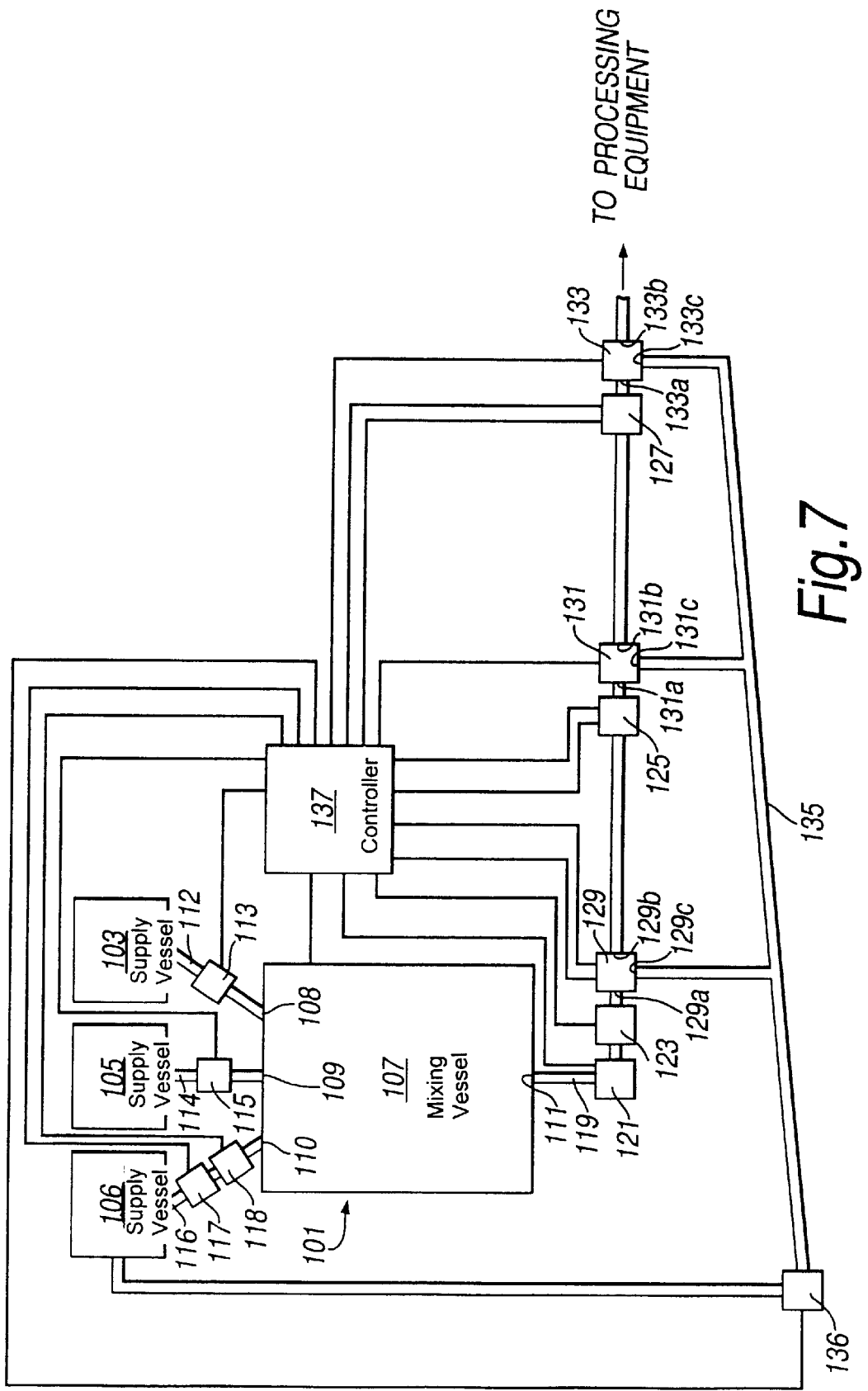
FIG. 7 illustrates schematically a mixing apparatus in accordance with a third embodiment of the present invention.
Figure 8:
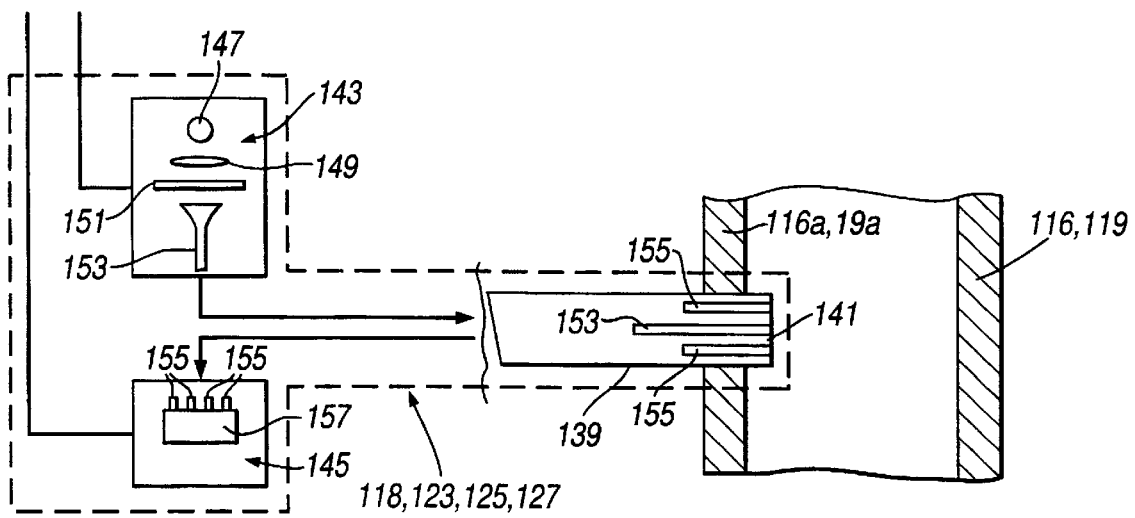
FIG. 8 illustrates a measuring device of the mixing apparatus of FIG. 7.

FIGS. 7 and 8 schematically illustrate a mixing apparatus or a component thereof in accordance with a third embodiment of the present invention. The mixing apparatus comprises a mixing device 101 for mixing materials, in this embodiment a continuous mixer having a non-rotating mixing vessel, a first supply vessel 103 for containing a first material to be mixed by the mixing device 101, a second supply vessel 105 for containing a second material to be mixed by the mixing device 101 and a third supply vessel 106 for containing a non-homogeneous mixture of the first and second materials. The mixing device 101 includes a mixing vessel 107 and has first, second and third inlet ports 108, 109, 110 and an outlet port 111. The first inlet port 108 is connected to the first supply vessel 103 by a first feed line 112 which includes a first feed mechanism 113, typically a pneumatic or mechanical device, for metering an amount of the first material per unit time to the mixing device 101. The second inlet port 109 is connected to the second supply vessel 105 by a second feed line 114 which includes a second feed mechanism 115, typically a pneumatic or mechanical device, for metering an amount of the second material per unit time to the mixing device 101. The third inlet port 110 is connected to the third supply vessel 106 by a third feed line 116 which includes a third feed mechanism 117, typically a pneumatic or mechanical device, for metering an amount of a non-homogeneous mixture of the first and second materials per unit time to the mixing device 101. The third feed line 116 further includes a measuring device 118 for measuring the composition of the non-homogeneous mixed material passing therethrough into the mixing device 101.

The mixing apparatus further comprises a supply line 119 connected to the outlet port 111 of the mixing device 101 for supplying mixed material to processing equipment, such as a tabletting machine. The supply line 119 includes a feed mechanism 121, typically a pneumatic or mechanical device, for feeding material therethrough. The supply line 119 further includes along the length thereof a plurality of measuring devices, in this embodiment first, second and third measuring devices 123, 125, 127, for measuring the composition of the mixed material at a plurality of points in the supply line 119 as the mixed material passes therethrough. The supply line 119 further includes a plurality of three-way valves, in this embodiment first, second and third valves 129, 131, 133, each disposed immediately downstream of a respective one of the first, second and third measuring devices 123, 125, 127. The first, second and third valves 129, 131, 133 each include an inlet port 129a, 131a, 133a, a first outlet port 129b, 131b, 133b and a second outlet port 129c, 131c, 133c, with the inlet ports 129a, 131a, 133a and the first outlet ports 129b, 131b, 133b being in the supply line 119 and the second outlet ports 129c, 131c, 133c being connected to a return line 135 for transferring mixed material not having the required homogeneity to the third supply vessel 106. The return line 135 includes a feed mechanism 136, typically a pneumatic or mechanical device, for feeding the non-homogeneous material to the third supply vessel 106. In this embodiment the sections of the return line 135 upstream of the feed mechanism 36 have a downwardly-directed component such that the non-homogeneous material flows by gravitational flow to the feed mechanism 136.

The mixing apparatus further comprises a controller 137, typically a computer or a programmable logic controller (PLC), for controlling the operation of each of the mixing device 101, the first feed mechanism 113 connected to the first supply vessel 103, the second feed mechanism 115 connected to the second supply vessel 105, the third feed mechanism 117 connected to the third supply vessel 106, the feed mechanism 121 in the supply line 119, the measuring device 118 in the third feed line 116, the first, second and third measuring devices 123, 125, 127 in the supply line 119, the first, second and third valves 129, 131, 133 in the supply line 119 and the feed mechanism 136 in the return line 135.

As illustrated in FIG. 8, each of the measuring device 118 in the third feed line 116 and the first, second and third measuring devices 123, 125, 127 in the supply line 119 are of the same construction and comprise a measurement probe 139, in this embodiment a reflectance probe, which extends through the peripheral wall 116a, 119a of the respective line 116, 119 such that the distal end 141 of the measurement probe 139, through which radiation is emitted and received, is directed into the respective line 116, 119. In this manner reflectance measurements can be taken from the mixed material passing through the respective line 116, 119. The measuring device 139 further comprises a radiation generating unit 143 for generating electromagnetic radiation and a detector unit 145 for detecting the radiation diffusely reflected by the mixed material. In this embodiment the radiation generating unit 143 comprises in the following order a radiation source 147, preferably a broad spectrum visible to infra-red source, such as a tungsten-halogen lamp, which emits radiation in the near infra-red interval of from 400 to 2500 nm, a focusing lens 149, a filter arrangement 151 and at least one fibre cable 153 for leading the focused and filtered radiation to the distal end 141 of the measurement probe 139. In other embodiments the radiation source 147 can be any of a source of visible light, such as an arc lamp, a source of x-rays, a laser, such as a diode laser, or a light-emitting diode (LED) and the filter arrangement 151 can be replaced by a monochromator or a spectrometer of Fourier transform kind. In this embodiment the detector unit 145 comprises in the following order an array of fibre cables 155, whose distal ends are arranged around the distal end of the at least one fibre cable 153 through which radiation is provided, and a detector 157 connected to the fibre cables 155. The detector 157 is preferably one of an integrating detector, such as an Si, PbS or In—Ga—As integrating detector, a diode array detector, such as an Si or In—Ga—As diode array detector, or a one or two-dimensional array detector, such as a CMOS chip, a CCD chip or a focal plane array. The distal ends of the fibre cables 155 are preferably spaced from the distal end of the at least one fibre cable 153 in order to minimise the effect of specular reflection or stray energy reaching the fibre cables 155. In use, the detector 157 will produce signals depending upon the composition of the mixed material and the frequency of the emitted radiation. These signals are amplified, filtered and digitised and passed to the controller 137.

Figure 9:
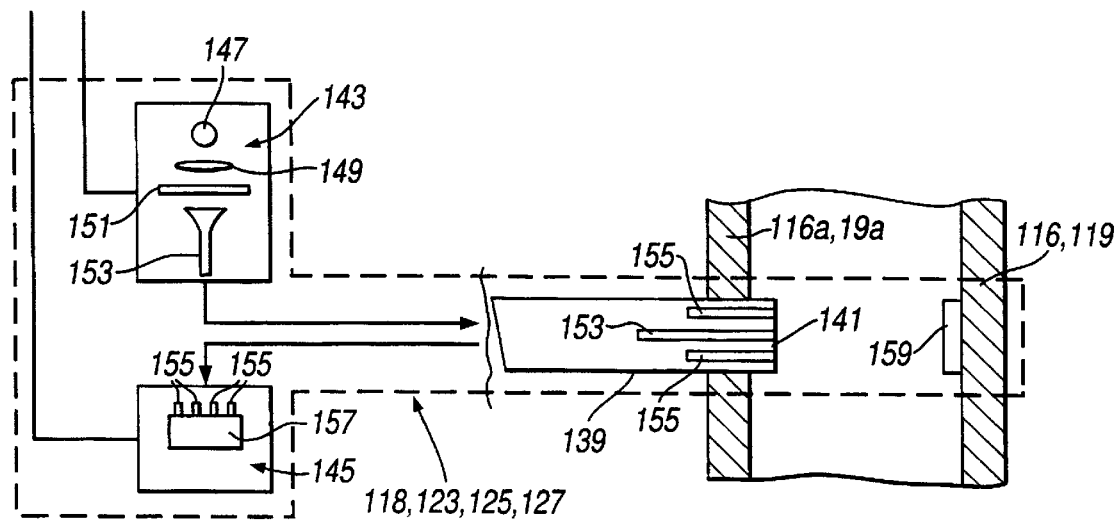
FIG. 9 illustrates a first modified measuring device for the mixing apparatus of FIG. 7.
Figure 10:
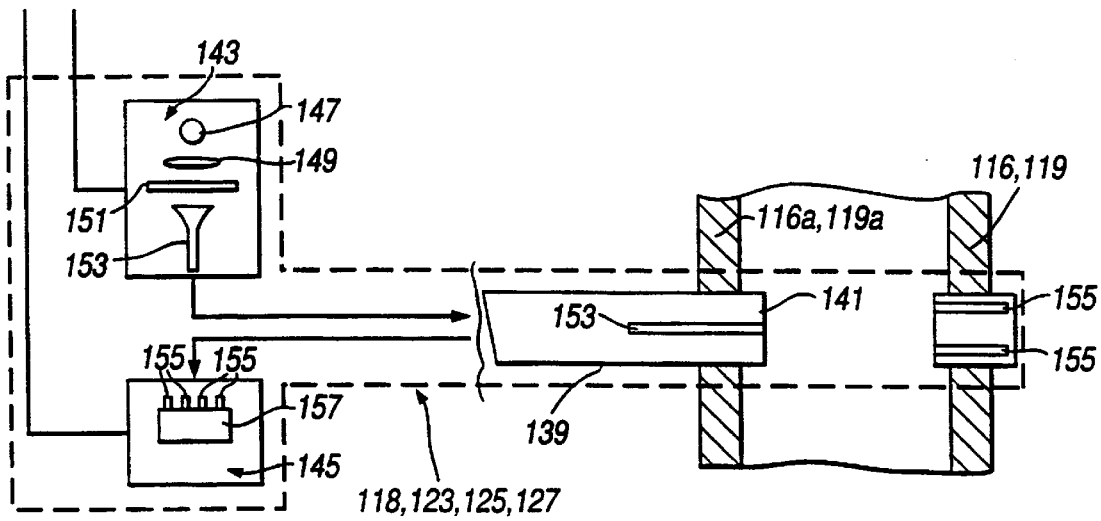
FIG. 10 illustrates a second modified measuring device for the mixing apparatus of FIG. 7.
Figure 11:
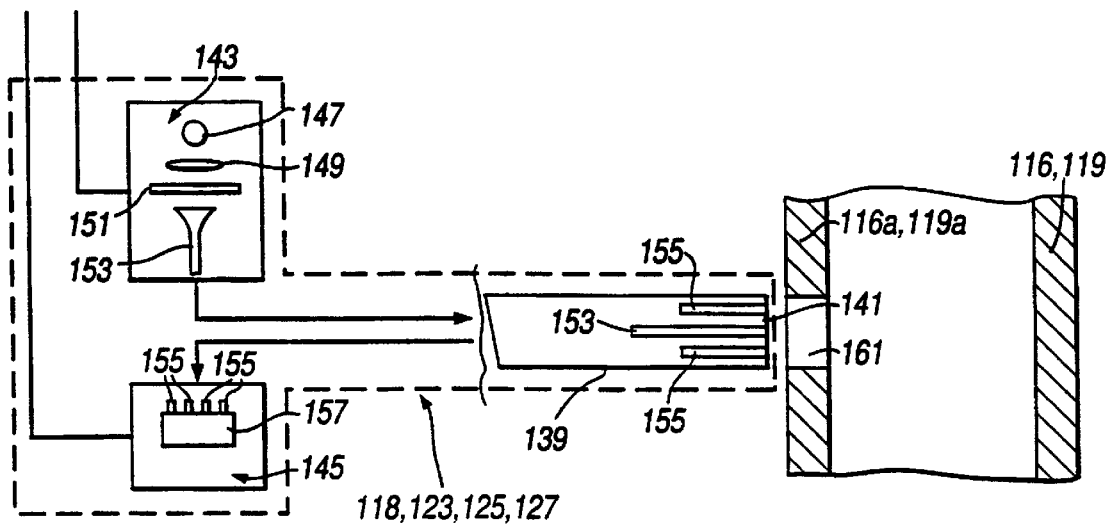
FIG. 11 illustrates a third modified measuring device for the mixing apparatus of FIG. 7.

FIGS. 9 to 11 respectively illustrate alternative measuring devices 118, 123, 125, 127 for the above-described mixing apparatus. These measuring devices 118, 123, 125, 127 are quite similar structurally and operate in the same manner as the measuring device 118, 123, 125, 127 in the above-described mixing apparatus. Hence, in order not to duplicate description unnecessarily, only the structural differences of these modified measuring devices 118, 123, 125, 127 will be described.

FIG. 9 illustrates a first modified measuring device 118, 123, 125, 127 which operates as a transflective measuring device. This measuring device 118, 123, 125, 127 differs from the first-described measuring device 118, 123, 125, 127 in that a reflective surface 159, typically a mirrored surface, is disposed in the respective line 116, 119, in this embodiment on the inner side of the respective line 116, 119, opposite the path of the radiation emitted from the at least one fibre cable 153. In use, radiation provided by the at least one fibre cable 153 passes through the material in the respective line 116, 119 and is reflected back to the fibre cables 155 by the reflective surface 159.

FIG. 10 illustrates a second modified measuring device 118, 123, 125, 127 which operates as a transmissive measuring device. This measuring device 118, 123, 125, 127 differs from the first-described measuring device 118, 123, 125, 127 in that the distal ends of the fibre cables 155 are disposed at the side of the respective line 116, 119, in this embodiment on the inner side of the respective line 116, 119, opposite the path of the radiation emitted from the at least one fibre cable 153. In use, radiation provided by the at least one fibre cable 153 passes through the material in the respective line 116, 119 and is received by the fibre cables 155.

FIG. 11 illustrates a third modified measuring device 118, 123, 125, 127 which operates as a reflectance measuring device. This measuring device 118, 123, 125, 127 differs from the first-described measuring device 118, 123, 125, 127 only in that the measurement probe 139 does not extend into the respective line 116, 119. Instead, the peripheral wall 116a, 119a of the respective line 116, 119 is provided with a window 161 which is transparent or at least translucent to the radiation employed by the measuring device 118, 123, 125, 127. It will, of course, be appreciated that the measuring devices 118, 123, 125, 127 described in relation to FIGS. 9 and 10 could also be so modified.

In use, the first, second and third feed mechanisms 113, 115, 117 connected respectively to the first, second and third supply vessels 103, 105, 106 are controlled by the controller 137 to meter selectively amounts of the first material, the second material and the non-homogeneous mixture of the first and second materials per unit time so as to feed the required proportions of the first and second materials to the mixing vessel 107 of the mixing device 101 which is operated for continuous mixing. The non-homogeneous mixture of the first and second materials contained in the third supply vessel 106 is collected during previous mixing of the first and second materials. By providing a measuring device 118 in the third feed line 116 connected to the third feed vessel 106, the composition of the non-homogeneous mixture of the first and second materials which is fed from the third supply vessel 106 can be measured on-line and the first, second and third feed mechanisms 113, 115, 117 connected to the first, second and third supply vessels 103, 105, 106 are operated so as selectively to feed to the mixing device 101 relative amounts of the first material, the second material and the non-homogeneous mixture of the first and second materials and thereby provide the required proportions of the first and second materials for mixing. In this way, no first and second material is wasted. As the materials are mixed, under the control of the controller 137, with the first, second and third valves 129, 131, 133 in the supply line 119 set to provide communication between the respective inlet ports 129a, 131a, 133a and first outlet ports 129b, 131b, 133b thereof, the feed mechanism 121 in the supply line 119 is actuated to feed mixed material from the mixing vessel 107 of the mixing device 101 through the supply line 119. As the mixed material passes through the supply line 119 the mixed material is first measured by the first measuring device 123 in the supply line 119. If the mixed material passing the first measuring device 123 in the supply line 119 is measured as having the required homogeneity, then the mixed material is fed further through the supply line 119 by the feed mechanism 121 therein. If, however, the mixed material passing the first measuring device 123 in the supply line 119 is measured as not having the required homogeneity, then, under the control of the controller 137, the first valve 129 in the supply line 121 is set to provide communication between the inlet port 129a and the second outlet port 129c thereof so as to divert the mixed material not having the required homogeneity into the return line 135 and the feed mechanism 136 in the return line 135 is actuated to transfer the mixed material not having the required homogeneity to the third supply vessel 106, with the mixed material being continuously measured by the first measuring device 123 in the supply line 119. When the mixed material passing the first measuring device 123 in the supply line 119 is measured as having the required homogeneity, then, under the control of the controller 137, the feed mechanism 136 in the return line 135 is stopped and the first valve 129 in the supply line 119 is set to provide communication between the inlet port 129a and the first outlet port 129b thereof so as to restore the flow path in the supply line 119. When the mixed material passing the first measuring device 123 in the supply line 119 is measured as having the required homogeneity, then the mixed material is fed further through the supply line 119 by the feed mechanism 121 therein. As the mixed material is fed further through the supply line 119 the mixed material is measured by the second measuring device 125 downstream of the first measuring device 123 in the supply line 119. If the mixed material passing the first and second measuring devices 123, 125 in the supply line 119 is measured as having the required homogeneity, then the mixed material is fed further through the supply line 119 by the feed mechanism 121 therein. If, however, the mixed material passing the second measuring device 125 in the supply line 119 is measured as no longer having the required homogeneity, as may occasionally happen because, for example, of segregation during flow, then, under the control of the controller 137, the second valve 131 in the supply line 121 is set to provide communication between the inlet port 131a and the second outlet port 131c thereof so as to divert the mixed material not having the required homogeneity into the return line 135 and the feed mechanism 136 in the return line 135 is actuated to transfer the mixed material not having the required homogeneity to the third supply vessel 106, with the mixed material being continuously measured by the second measuring device 125 in the supply line 119. When the mixed material passing the second measuring device 125 in the supply line 119 is measured again as having the required homogeneity, then, under the control of the controller 137, the feed mechanism 136 in the delivery line 135 is stopped and the second valve 131 in the supply line 119 is set to provide communication between the inlet port 131a and the first outlet port 131b thereof so as to restore the flow path through the supply line 119. When the mixed material passing the first and second measuring devices 123, 125 in the supply line 119 is measured as having the required homogeneity, then the mixed material is fed further through the supply line 119 by the feed mechanism 121 therein. As the mixed material is fed further through the supply line 119 the mixed material is measured by the third measuring device 127 downstream of the second measuring device 125 in the supply line 119. If the mixed material passing the third measuring device 127 in the supply line 119 is measured as having the required homogeneity, then the mixed material is fed further through the supply line 119 by the feed mechanism 121 therein to processing equipment. If, however, the mixed material passing the third measuring device 127 in the supply line 119 is measured as no longer having the required homogeneity, then, under the control of the controller 137, the third valve 133 in the supply line 121 is set to provide communication between the inlet port 133a and the second outlet port 133c thereof so as to divert the mixed material not having the required homogeneity into the return line 135 and the feed mechanism 136 in the return line 135 is actuated to transfer the mixed material not having the required homogeneity to the third supply vessel 106, with the mixed material being continuously measured by the third measuring device 127 in the supply line 119. When the mixed material passing the third measuring device 127 in the supply line 119 is measured again as having the required homogeneity, then, under the control of the controller 137, the feed mechanism 136 in the return line 135 is stopped and the third valve 133 in the supply line 119 is set to provide communication between the inlet port 133a and the first outlet port 133b thereof so as to restore the flow path through the supply line 119. When the mixed material passing the first, second and third measuring devices 123, 125, 127 in the supply line 119 is measured as having the required homogeneity, then the mixed material is fed further through the supply line 119 by the feed mechanism 121 therein to processing equipment.

Figure 12:
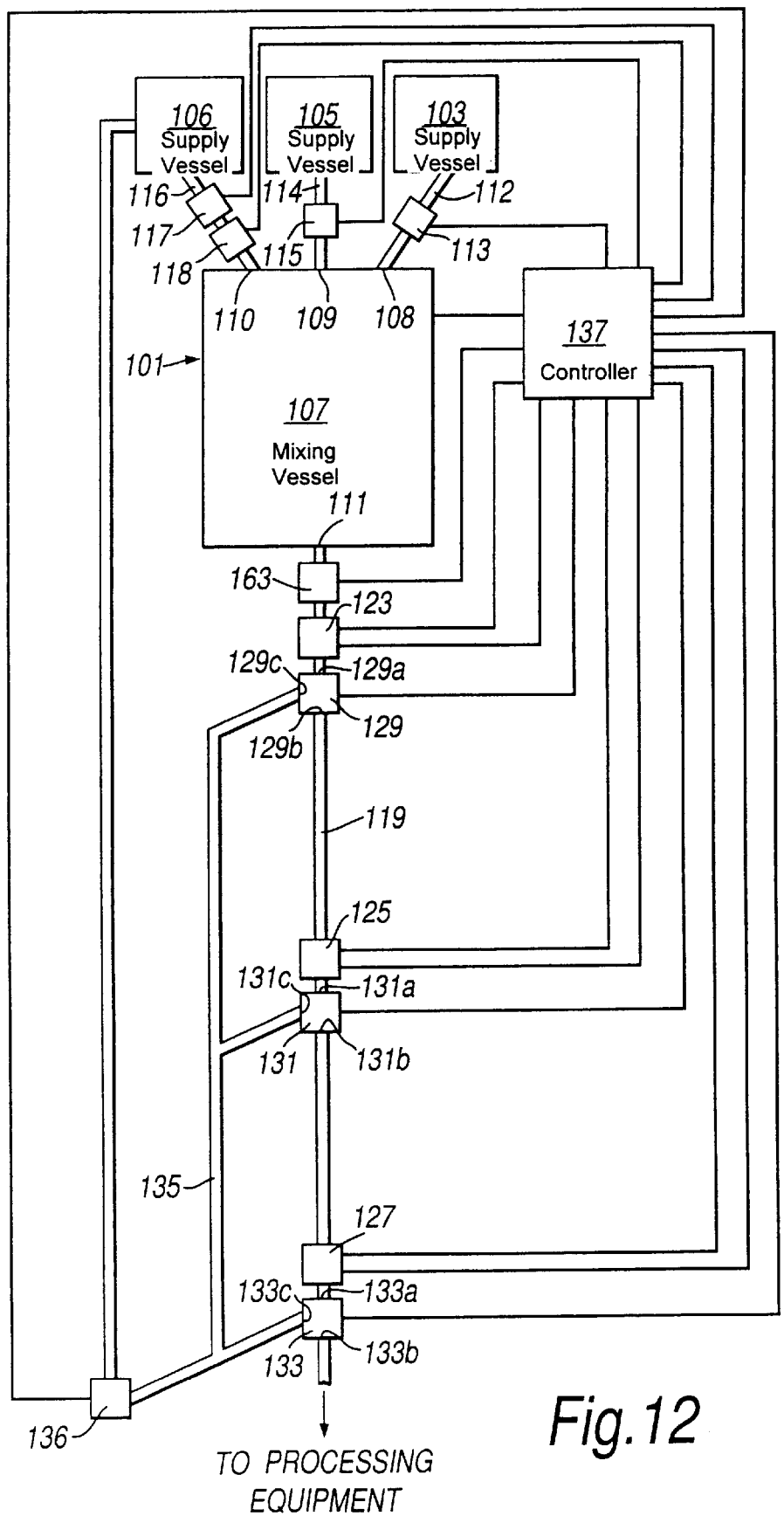
FIG. 12 illustrates schematically a mixing apparatus in accordance with a fourth embodiment of the present invention.

FIG. 12 illustrates a mixing apparatus in accordance with a fourth embodiment of the present invention.

The mixing apparatus in accordance with this embodiment is almost structurally identical to the mixing apparatus in accordance with the third embodiment of the present invention. Hence, in order not to duplicate description unnecessarily, only the structural differences of this modified mixing apparatus will be described; like reference signs designating like parts.

The mixing apparatus in accordance with this embodiment differs from the mixing apparatus in accordance with the third embodiment of the present invention only in that the supply line 119 is configured such that material passes therethrough by gravitational flow and in that a two-port feed valve 163 replaces the feed mechanism 121 in the supply line 119. In this embodiment the supply line 119 is vertically directed, but it will, of course, be appreciated that other configurations are possible. Indeed, any configuration could be employed where the supply line 119 has a downwardly-directed component sufficient to provide gravitational flow therethrough.

In use, the mixing apparatus in accordance with this embodiment operates in the same manner as the mixing apparatus in accordance with the third embodiment of the present invention, but with the feed valve 163 being selectively opened and closed to allow mixed material to flow through the supply line 119.

Finally, it will be understood by a person skilled in the art that the present invention has been described in its preferred embodiments and can be modified in many different ways without departing from the scope of the invention as defined by the appended claims.

Firstly, for example, whilst the mixing apparatuses of the above-described embodiments are configured to supply a mixture of two materials, it will be understood that these mixing apparatuses are readily adaptable to mix any number of materials.

Secondly, for example, in a further modified embodiment the measuring devices 23, 25, 27, 118, 123, 125, 127 employed in the mixing apparatuses of the above-described embodiments could include only the measurement probe 39, 139 and instead the mixing apparatuses include only a single radiation generating unit 43, 143 and a single detector unit 45, 145 which are selectively coupled to a respective one of the measuring devices 23, 25, 27, 118, 123, 125, 127 by a multiplexer unit under the control of the controller 37, 137.

What is claimed is:

1. A mixing apparatus for supplying a mixture having a required homogeneity, comprising:
    a mixing device for mixing a plurality of materials, the mixing device comprising a mixing vessel and having at least one inlet port and an outlet port;
    a supply line connected to the outlet port of the mixing device;
    at least one measuring device for measuring on-line at at least one point in the supply line the composition of the mixed material passing in use through the supply line, and
    at least one flow diversion mechanism for selectively diverting from at least one point in the supply line mixed material passing in use through the supply line which is measured as not having the required homogeneity.

2. The apparatus of claim 1, wherein the at least one measuring device measures on-line the composition of the mixed material at a plurality of points in the supply line.

3. The apparatus of claim 1, comprising a plurality of measuring devices for measuring on-line at a plurality of points in the supply line the composition of the mixed material passing in use through the supply line.

4. The apparatus of claims 1 or 3, wherein one measurement point is at the inlet end of the supply line.

5. The apparatus of claim 1 or 3, wherein one measurement point is at the outlet end of the supply line.

6. The apparatus of claim 2 or 3, wherein one measurement point is at the inlet end of the supply line and another measurement point is at the outlet end of the supply line.

7. The apparatus of claim 1 or 3, wherein the at least one diversion point is downstream of the upstreammost measurement point.

8. The apparatus of claim 1 or 3, comprising a plurality of flow diversion mechanisms for selectively diverting from one or more of a plurality of points in the supply line mixed material passing in use through the supply line which is measured as not having the required homogeneity.

9. The apparatus of claim 8, wherein each diversion point is downstream of a respective measurement point.

10. The apparatus of claim 8, wherein each flow diversion mechanism comprises a valve disposed in the supply line, the valve having an inlet port and a first outlet port connected in the supply line and a second outlet port through which mixed material measured as not having the required homogeneity is in use diverted.

11. The apparatus of claim 10, further comprising a transfer line into which mixed material measured as not having the required homogeneity is in use diverted.

12. The apparatus of claim 11, wherein at least a section of the transfer line is configured such that the mixed material diverted thereinto can flow by gravitational flow therethrough.

13. The apparatus of claim 12, wherein the second outlet port of each valve is connected to the transfer line.

14. The apparatus of claim 1 or 3, further comprising a flow control mechanism for causing the mixed material to flow through the supply line.

15. The apparatus of claim 14, wherein the flow control mechanism is a feed mechanism for feeding the mixed material through the supply line.

16. The apparatus of claim 14, wherein the supply line is configured such that the mixed material can flow by gravitational flow therethrough and the flow control mechanism is a valve for selectively permitting the mixed material to flow through the supply line.

17. The apparatus of claim 16, wherein the supply line is substantially vertically directed.

18. The apparatus of claim 1 or 3, further comprising a plurality of supply vessels for containing separately the materials to be mixed in the mixing vessel of the mixing device and a further supply vessel for containing a mixture of the materials to mixed, the supply vessels being connected to the at least one inlet port of the mixing device by respective feed lines which each include a flow control mechanism operable to meter per unit time to the mixing device amounts of the respective materials to be mixed and the mixture of the materials to be mixed.

19. The apparatus of claim 18, further comprising a further measuring device in the feed line connected to the further supply vessel for measuring the composition of the mixed material passing in use through the feed line connected to the further supply vessel.

20. The apparatus of claim 1 or 3, wherein at least one of the at least one measuring device is a spectroscopic measuring device.

21. The apparatus of claim 20, wherein the spectroscopic measuring device is one of a reflectance, transflectance or transmission device.

22. The apparatus of claim 20, wherein the spectroscopic measuring device is an infra-red spectrophotometer.

23. The apparatus of claim 20, wherein the spectroscopic measuring device is a near infra-red spectrophotometer.

24. The apparatus of claim 20, wherein the spectroscopic measuring device is an x-ray spectrophotometer.

25. The apparatus of claim 20, wherein the spectroscopic measuring device is a visible light spectrophotometer.

26. The apparatus of claim 20, wherein the spectroscopic measuring device is a raman spectrophotometer.

27. The apparatus of claim 20, wherein the spectroscopic measuring device is a microwave spectrophotometer.

28. The apparatus of claim 20, wherein the spectroscopic measuring device is a nuclear magnetic resonance spectrophotometer.

29. The apparatus of claim 1 or 3, wherein at least one of the at least one measuring device is a polarimeter.

30. The apparatus of claim 1 or 3, wherein the mixing vessel of the mixing device is a non-rotating vessel.

31. The apparatus of claim 1 or 3, wherein the mixing device is a continuous mixer.

32. The apparatus of claim 1 or 3, wherein the mixing device is a batch mixer.

33. The apparatus of claim 7, further comprising a plurality of flow diversion mechanisms for selectively diverting from one or more of a plurality of points in the supply line mixed material passing in use through the supply line which is measured as not having the required homogeneity.

34. A method of supplying a mixture having a required homogeneity, comprising the steps of:
   introducing a plurality of materials to be mixed into a mixing vessel of a mixing device;
   mixing the plurality of materials in the mixing vessel to form a mixed material;
   supplying mixed material from an outlet port of the mixing device through a supply line;
   measuring on-line at at least one point in the supply line the composition of the mixed material passing through the supply line, and
   diverting from at least one point in the supply line the mixed material passing through the supply line which is measured as not having the required homogeneity.

35. The method of claim 34, comprising the step of measuring on-line at a plurality of points in the supply line the composition of the mixed material passing through the supply line.

36. The method of claim 34 or 35, wherein one measurement point is at the inlet end of the supply line.

37. The method of claim 34 or 35, wherein one measurement point is at the outlet end of the supply line.

38. The method of claim 34 or 35, wherein one measurement point is at the inlet end of the supply line and another measurement point is at the outlet end of the supply line.

39. The method of claim 34 or 35, wherein the at least one diversion point is downstream of the upstreammost measurement point.

40. The method of claim 34 or 35, comprising the step of selectively diverting from one or more of a plurality of points in the supply line the mixed material passing through the supply line which is measured as not having the required homogeneity.

41. The method of claim 40, wherein each diversion point is downstream of a respective measurement point.

42. The method of claim 34 or 35, wherein the materials to be mixed are introduced continuously into the mixing vessel.

43. The method of claim 42, further comprising the step of transferring the mixed material diverted from the supply line to a second vessel.

44. The method of claim 43, wherein the step of introducing the materials to be mixed into the mixing vessel of the mixing device comprises the step of selectively metering per unit time to the mixing device amounts of the mixed material from the second vessel and the materials to be mixed and further comprising the step of measuring on-line the composition of the mixed material metered from the second vessel such that amounts of the respective materials to be mixed are separately selectively metered to the mixing device in addition to mixed material metered from the second vessel so as to achieve the required composition.

45. The method of claim 34 or 35, wherein the materials to be mixed are introduced as a batch into the mixing vessel of the mixing device.

46. The method of claim 34 or 35, wherein the mixing vessel of the mixing device is a non-rotating vessel.

* * * * *